340-870.14 SR CROSS REFERENCE SEARCH ROOM

XR 2,798,986

July 9, 1957 H. N. LIVINGSTON 2,798,986

ELECTRICAL APPARATUS

Filed Oct. 23, 1953

INVENTOR.
HERSCHEL N. LIVINGSTON
BY Arthur H. Swanson
ATTORNEY.

2798986
OR IN 361/243

United States Patent Office 2,798,986

Patented July 9, 1957

2,798,986

ELECTRICAL APPARATUS

Herschel N. Livingston, Philadelphia, Pa., assignor to Minneapolis-Honeywell Regulator Company, Minneapolis, Minn., a corporation of Delaware Application October 23, 1953, Serial No. 388,024

9 Claims. (Cl. 317—6)

Figures 1, 2:
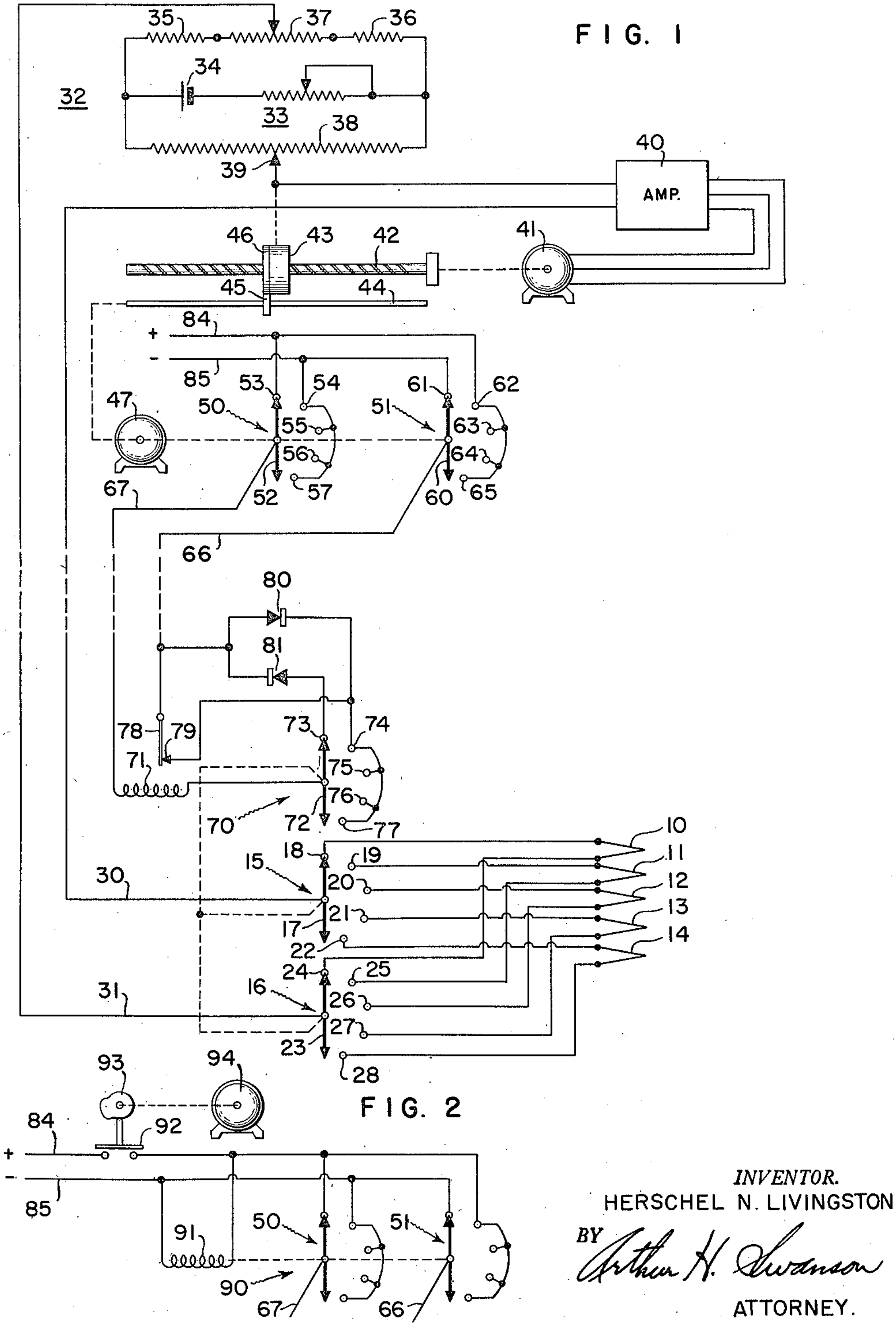

A general object of the present invention is to provide a new and improved apparatus for synchronizing a pair of stepping switches. More specifically, the invention is concerned with a synchronizing apparatus for a telemetering system which is characterized by its simplicity, its ability to quickly establish synchronism, and its use of a minimum of components and interconnecting wires.

In the field of process measurement and control it is frequently desirable to observe the magnitude of several different variables at some remote point by means of a single measuring instrument. As the remote reading may frequently be accomplished over leased telephone or telegraph wires, the cost of a separate pair of wires for each variable is prohibitive and thus necessitates some means for minimizing the number of essential interconnecting wires between the variable transmitter and receiver. If fewer wires than variables are used, some type of sequential switching apparatus should be used in order that a number of variables may be sequentially connected into the circuit for measuring and recording. When such switches are used, there is a problem of synchronizing the switching operation at the transmitter and receiver so that the measuring instrument will make an identifiable record of the particular variable being measured. While such synchronism is desirable, to be useful, it must be simple, reliable, and involve a minimum of additional parts so as to insure a long trouble-free operational life.

It is therefore a more specific object of the present invention to provide a new and improved apparatus for synchronizing a pair of sequentially operated switches of a transmitter and receiver.

Another more specific object of the present invention is to provide a new and improved synchronizing apparatus for a pair of sequentially operated switches wherein one of said switches incorporates a relay which is periodically operated and the other of the switches is effective to periodically reverse the energizing polarity of the relay so as to effect synchronization.

Still another more specific object of the present invention is to provide a synchronizing apparatus for a pair of sequentially operated switches which includes a pair of asymmetrically conducting devices so interconnected between said switches as to insure continuous synchronization of said switches.

A further more specific object of the present invention is to provide means for synchronizing a control switch and a follower switch by means of said control switch periodically reversing the polarity of energizng current to the follower switch wherein said follower switch has in the energizing circuit thereof a pair of asymmetrically conducting devices which will discriminate the polarity of the signal from the control switch and effect operation of the follower switch so as to maintain synchronization.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Of the drawings:

Fig. 1 is a schematic showing of one form of the invention applied to a multiple point recorder; and Fig. 2 shows a modified form of apparatus for use on the multiple point recorder.

Referring now to Fig. 1, the numerals 10, 11, 12, 13, and 14 represent thermocouples which may be positioned at some remote point for observing the magnitude of some variable or variables in a process. These thermocouples are connected to a pair of sequentially operated sampling switches 15 and 16. The switch 15 comprises a switch arm 17 having electrical contacts on either end thereof and a plurality of switch contacts identified by the numerals 18, 19, 20, 21, and 22. The switch 16 comprises a switch arm 23 having electrical contacts on either end thereof and a plurality of contacts 24, 25, 26, 27, and 28.

Each of the switch arms 17 and 23 is connected by electrical leads 30 and 31, respectively, to a suitable potentiometric measuring circuit 32. This measuring circuit includes a bridge circuit 33 receiving energization from a suitable direct current source such as a battery 34. One side of the bridge is formed by a pair of fixed resistors 35 and 36 with an adjustable resistor 37 positioned therebetween. The other side of the bridge is formed by a slide-wire resistor 38 having a slider 39 cooperating therewith.

For detecting the electrical balance condition between the electrical signal on the input leads 30 and 31 and the output of the bridge network 33 is an amplifier 40 which is effective to convert a direct current potential on the input thereof into a suitable alternating current which may be used to reversibly control the operation of a balancing motor 41. The bridge circuit, amplifier, and motor combination may take the form of the self-balancing potentiometric apparatus disclosed in the patent to Walter P. Wills, No. 2,423,540, issued July 8, 1947.

The motor 41 may be used in any desired manner to effect the rebalancing of the slider 39. This rebalancing may be accomplished by a suitable helical drive gear 42 which is effective to carry a print wheel mechanism 43 as well as the slider 39. The print wheel is arranged to be rotated in its position upon the drive gear 42 by a further drive shaft 44 connected through gears 45 and 46. The drive shaft 44 is driven by a continuously operated motor 47 and this motor is effective to advance the print wheel mechanism periodically as each of the input variables is sequentially connected into the measuring circuit. The print wheel mechanism and the associated drive therefore may be of the type shown in the Caldwell Patent, No. 2,525,094 issued October 10, 1950.

The motor 47 is also used to drive a pair of sequentially operated control switches 50 and 51. The switch 50 comprises a switch arm 52 having electrical contacts on either end thereof and a plurality of contacts 53, 54, 55, 56, and 57. The control switch 51 comprises a switch arm 60 having electrical contacts on either end thereof and a plurality of contacts 61, 62, 63, 64, and 65.

The switch arms 52 and 60 are connected by suitable electrical leads 66 and 67 to a follower switch mechanism 70.

The switch mechanism 70 comprises an operating or stepping relay coil 71, a switch arm 72 having electrical contacts on either end thereof, and a plurality of switch contacts 73, 74, 75, 76, and 77. The follower switch 70 also includes a switch blade 78 which is normally biased, by means not shown, into engagement with an associated contact 79 when the relay coil 71 is deenergized.

Effectively in series with the energizing circuit for the relay coil 71 are a pair of asymmetrically conducting devices 80 and 81. These devices may well take the form of any conventional commercially available rectifier.

In considering the operation of the apparatus of Fig. 1, with the apparatus as shown in the drawing, the switch arms are all in the same position, indicating synchronism. In other words, the switch arm 52 is engaging contact 53, switch arm 60 is engaging contact 61, switch arm 72 is engaging contact 73, switch arm 17 is engaging contact 18, and switch arm 23 is engaging contact 24, the latter three switch arms being ganged together. When so connected, the thermocouple 10 will be connected to the measuring circuit by way of a circuit that may be traced from the upper terminal of the thermocouple 10, through switch contact 18, switch arm 17, conductor 30, amplifier 40, bridge network 33, lead 31, arm 23, and switch contact 24, back to the lower terminal of the thermocouple 10. The measuring apparatus including the amplifier 40 and motor 41 will drive the helical balancing gear 42 so as to position the slider 39 to a balance position. The print wheel mechanism 43, upon reaching the balanced condition, will be effective to make an appropriate mark on a suitable chart paper, not shown.

While the above measuring operation is going on, the follower switch 70 will have the relay coil 71 energized by a circuit that may be traced from an input direct current power source identified by leads 84 and 85, with the connection passing from lead 84 through switch contact 53, switch arm 52, lead 67, coil 71, switch arm 72, switch contact 73, rectifier 81, lead 66, switch arm 60, and switch contact 61 back to the other power source lead 85. The relay coil 71 will be energized and when so energized the switch blade 78 and contact 79 will be open circuited.

The motor 47 will continue to operate, and its speed of operation will be dependent upon the number and type of variables being recorded. A representative time for each switch operation may be five seconds. In other words, the switch arm 52 will remain in engagement with the contact 53 for a period of approximately five seconds. As the motor 47 operates, the switch arm 52 will be advanced to the switch contact 54 as will the switch arm 60 be advanced to the switch contact 62. During the switching operation, the energizing circuit to the relay coil 71 will become deenergized and this relay coil when deenergized will cause the switch arm 72 to advance to its next position which will now be in engagement with switch contact 74. In other words, the relay switch 70 is advanced one position each time the relay coil 71 becomes deenergized.

When the switch arm 72 engages contact 74, the switch arms 17 and 23 will move into engagement with their respective contacts 19 and 25. This latter switching operation will connect the thermocouple 11 into the measuring circuit and the apparatus will go through a balancing operation as set forth above.

With the motor 47 having moved the arms 52 and 60 from their initial positions shown in the drawing, the switch arms are effective to reverse the polarity of the signal appearing upon the leads 66 and 67, and the signal applied to the relay coil 71. The energizing circuit for the coil 71 may now be traced from the input lead 84 to contact 62, switch arm 60, lead 66, rectifier 80, switch contact 74, switch arm 72, coil 71, lead 67, arm 52, and contact 54 back to the other power lead 85. The last traced circuit will hold the relay 71 in an energized position and the relay will hold the switch arms 72, 17, and 23 in a fixed position. The relay coil 71 will also be maintaining the switch blade 78 out of engagement with contact 79.

Each of the contacts 54 through 57, 62 through 65, and 74 through 77 is electrically connected to the others in its group so that as the switch arms 52 and 60 are advanced, the operation just explained will apply, and, with each opening and subsequent closing of the contacts of switches 50 and 51, the follower switch 70 will be effective to advance to a corresponding position.

As the apparatus may frequently be used on leased wires of considerable length, circuit interruption or short circuiting may cause the follower switch to get out of step with the control switch as it is driven by the motor 47. For this reason, it is essential that some accurate and reliable synchronizing means be provided to insure that the apparatus will be brought back into synchronism before a complete operating cycle has taken place. The apparatus which has been explained above will accomplish this synchronizing in the following manner.

Assuming that the arm 72 is in engagement with some contact other than the contact 73, the switch arm 72 will continue to advance with each operation of the control switches 50 and 51 until such time as the arm 72 engages the contact 73. If the switch arms 52 and 60 are not in engagement with their respective contacts 53 and 61, the relay coil 71 will not be energized until the arms 52 and 60 do engage their contacts 53 and 61 respectively. This will be seen if it is assumed that the switch arm 52 is engaging contact 56 and the switch arm 60 is engaging contact 64. When the switch arms are in this latter position, the electrical circuit from the power source leads 84 and 85 may be traced from the input lead 84 through contact 64, switch arm 60, lead 66, rectifier 81, switch contact 73, switch arm 72, relay coil 71, lead 67, arm 52, and switch contact 56 back to the other input lead 85. It will be noted in this last traced circuit that the rectifier 81 is so connected as to oppose the flow of any current due to its high back resistance. This will prevent energization of the coil 71 and the coil will remain deenergized. The motor 47 will continue to operate with the arm 52 engaging contact 57 and the arm 60 engaging contact 65. As the circuit through these contacts will be the same as through contacts 56 and 64, the relay coil 71 will still remain deenergized.

As soon as the motor 47 has advanced the switch arms 52 and 60 so as to engage their respective contacts 53 and 61, the first traced energizing circuit for the coil 71 will be completed. Due to the fact that the polarity of the signal from the direct current power leads 84 and 85 has been reversed, the energizing circuit to the coil 71 will now be effectively completed since the resistance of the rectifier 81 will appear to be low. When the relay coil 71 becomes energized, the apparatus is then conditioned for stepping to the next contact and the operation will be synchronized.

If the follower switch 70 should lag behind the control switches 50 and 51, the apparatus will be synchronized in the following manner. Assume that the switch arms 52 and 60 are engaging their respective contacts 53 and 61, and that the arm 72 is engaging contact 75. The energizing circuit for relay coil 71 with this assumed connection may be traced from the input lead 84 to switch contact 53, switch arm 52, lead 67, coil 71, arm 72, switch contact 75, rectifier 80, lead 66, arm 60, and contact 61 back to the other input lead 85. This circuit is through the rectifier 80 in the reverse direction and the rectifier will have a high resistance which will prevent energization of the coil 77. Since the coil 71 is deenergized, the blade 78 will engage contact 79. When the contact 79 engages the blade 78, an energizing circuit is established around the rectifier 80 and the relay coil 71 will become energized so as to break the circuit between blade 78 and contact 79. This will effectively cause the arm 72 to advance to a further position so that the arm 72 engages contact 76. As synchronism has still not been restored, the circuit for the relay coil is still in the backward direction through rectifier 80 and the relay will again become deenergized. This continued energization and deenergization will cause a vibrating or motoring of the relay coil so as to advance the arm 72 around to a position wherein relay coil 71 will remain energized. This will occur as soon as the arm 72 has been advanced to engage the contact 73. In one particular embodiment of the apparatus, the relay mechanism in the last assumed operating condition will operate at the rate of fifty switch operations per second in order to effect synchronization.

It will therefore be seen that whether the follower switch leads or lags the control switches, the apparatus will come into synchronization before a complete revolution of the respective switch arms has taken place. In other words, if the switch arms of the control switches are in a position in which the initial contacts 53 and 61 are in the circuit before the arm 72 reaches the contact 73, the apparatus will synchronize with the relay coil 71 stepping the arm 72 to its synchronized position. Likewise, if the arm 72 reaches the contact 73 before the arms 52 and 60 reach the contacts 53 and 61, the apparatus will likewise synchronize with the coil 71 remaining deenergized until the arms 52 and 60 catch up.

The apparatus disclosed in Fig. 2 shows a modified form of control switch which may be used in place of the motor 47 shown in Fig. 1. In this arrangement, the relay driven stepping switch 90 is provided, and this stepping switch includes a relay coil 91, which is effective to drive the switch arms and contacts of the control switches 50 and 51 which may be the same as those shown in Fig. 1, and also drives the print wheel mechanism of Fig. 1. In this form of the apparatus, the direct current power leads 84 and 85 are periodically open circuited by the operation of a cam 93 cyclically driven by a motor 94. This apparatus may be used in place of the apparatus of Fig. 1 and will function in a similar manner. The only difference will be that the relay coil 91 will be periodically energized and by appropriate ratchet means, not shown, the respective control switches 50 and 51 will be driven.

The apparatus as shown in Fig. 1 requires that the contacts of the control switches be non-shorting during the switching operation so that the relay coil 71 will become deenergized. If a shorting type of switch is used, as can be used in Fig. 2, an interrupter switch as shown at 92 may be used in the power leads 84 and 85.

While the apparatus has been shown for use with five thermocouples, it will be obvious that a much larger number of thermocouples may be used and when so used, additional corresponding switch contacts must be applied to each of the stepping switches of the apparatus. The operation of this latter type of apparatus will obviously be the same as has been explained above.

While, in accordance with the provisions of the statutes, there have been illustrated and described preferred embodiments of the invention, those skilled in the art will understand that changes may be made in the form of the apparatus disclosed without departing from the spirit of the invention as set forth in the appended claims, and that some features of the present invention may be used to advantage without a corresponding use of other features.

Having now described my invention, what I claim as new and desire to secure by Letters Patent is:

1. Apparatus for synchronizing a pair of sequentially operating stepping switches comprising, a multi-contact control switch having a switch arm and a plurality of contacts, means connected to said switch arm to advance said arm over said contacts, a stepping relay connected to be controlled by said control switch, said relay having a switch arm and contacts to match said control switch, a two wire connection between said relay and said control switch, means including said control switch for periodically reversing the polarity of the energizing signal to said relay, and an asymmetrically conductive device in series with said relay to maintain said relay ineffective when said relay switch contacts are not in agreement with said control switch.

2. Synchronizing apparatus comprising, control switch means having a switch arm and a plurality of switch contacts, means for sequentially advancing said arm over said contacts, follower switch means having a switch arm and a plurality of switch contacts corresponding to the contacts of said control switch means, a switch arm actuator for said follower switch means comprising a relay coil, a source of direct current control potential, means connecting said source to said relay coil including said control switch means and said follower switch means so that as said arm of said control switch advances, said relay will advance the arm of said follower switch, means including said control switch means reversing the connection of said source of control potential to said relay, and an asymmetrically conductive device in series with said last named connection, said relay coil being operative in said last named connection when said follower switch means is in synchronism with said control switch means.

3. Electrical switching apparatus comprising, a pair of control switches each having a switch arm, a first switch contact, and a plurality of additional switch contacts, the latter of which are all electrically connected, motor means connected to sequentially drive said switch arm over the contacts associated therewith, a direct current power source, a follower switch comprising a switch arm, a first switch contact, and a plurality of additional contacts corresponding to the contacts of said pair of control switches, a first and second rectifier, a control relay for driving said switch arm of said follower switch, and circuit means connecting said direct current power source to said relay, said circuit means comprising the switch arms of all of said switches cooperating with the contacts associated therewith with the circuit so arranged when synchronized that each of said switch arms is in engagement with said respective first contacts, said relay will be energized through said first rectifier and when each of said switch arms is in engagement with any one of the other of said respective contacts, said relay will be energized through said second rectifier.

4. Apparatus as defined in claim 3 wherein said first pair of control switches reverses the polarity of the connections of said direct current power source to said relay when said arms of said pair are moved from said plurality of contacts to the respective first contacts.

5. Apparatus as defined in claim 4 wherein said first and second rectifiers are connected together at one end with their conducting paths being opposite.

6. Electrical switching apparatus comprising, a pair of control switches each having a switch arm, a first contact, and a plurality of additional switch contacts, the latter of which are electrically connected, means for sequentially moving said switch arms over their associated contacts, a follower switch, said follower switch comprising a switch arm, a first contact and a plurality of additional switch contacts, the latter of which are electrically connected, a first rectifier connected between the switch arm of one of said pair of control switches and said first contact of said follower switch, a second rectifier connected between said switch arm of said one of said pair of control switches and said plurality of switch contacts of said follower switch, a driving relay coil for said follower switch, means connecting said relay coil between the switch arm of said follower switch and the switch arm of the other of said pair of control switches, and a direct current source of potential having one lead connected to the first contact of the one of said pair of control switches and the plurality of contacts of the other of said pair of control switches and the other lead connected to the first contact of said other of said pair of control switches and the plurality of contacts of said one of said control switches.

7. Apparatus as defined in claim 6 wherein said second rectifier has a relay coil controlled switch in parallel therewith.

8. In apparatus for synchronizing a pair of sequentially operating stepping switches, the combination comprising, a first rectifier, a second rectifier reversibly connected with respect to said first rectifier to a common terminal, and a relay actuated switch controlled by one of said stepping switches connected directly in parallel with one of said rectifiers and independent of said stepping switches.

9. Apparatus for synchronizing a rotary member with a sequentially operating variable selector switch, comprising, motor means for driving the rotary member, first and second control switches connected to be driven by said motor means, each of said switches comprising a switch arm, a first contact, and a plurality of additional electrically connected contacts, a motor relay comprising a driving coil, a switch arm connected to said driving coil, a first contact, and a plurality of additional electrically connected contacts, a pair of reversibly connected rectifiers, one of which is connected to said first contact of said motor relay and the other of which is connected to said plurality of contacts of said motor relay, a direct current source of power, a circuit means including said first and second control switches connecting said source of power to said motor relay, said control switches periodically reversing the polarity of said direct current source of power, means including said rectifiers for sensing the polarity of said source of power to maintain synchronism between said control switches and said motor relay, and a variable selector switch connected to be driven by said motor relay.

References Cited in the file of this patent

UNITED STATES PATENTS

| | | |
|---|---|---|
| 2,059,896 | Oliver | Nov. 3, 1936 |
| 2,123,220 | Weld | July 12, 1938 |
| 2,363,061 | Harrington | Nov. 21, 1944 |
| 2,502,215 | Giffen et al. | Mar. 28, 1950 |